US009333969B2

(12) United States Patent
Cao (10) Patent No.: US 9,333,969 B2
(45) Date of Patent: May 10, 2016

(54) HYBRID VEHICLE

(71) Applicant: DENSO CORPORATION, Kariya, Aichi-pref. (JP)

(72) Inventor: Junmin Cao, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/599,634

(22) Filed: Jan. 19, 2015

(65) Prior Publication Data

US 2015/0217762 A1    Aug. 6, 2015

(30) Foreign Application Priority Data

Feb. 6, 2014    (JP) .................................. 2014-021629

(51) Int. Cl.
| | |
|---|---|
| *B60K 6/445* | (2007.10) |
| *B60W 20/00* | (2016.01) |
| *B60W 10/06* | (2006.01) |
| *B60W 10/08* | (2006.01) |
| *B60W 10/188* | (2012.01) |

(52) U.S. Cl.
CPC ................ *B60W 20/40* (2013.01); *B60K 6/445* (2013.01); *B60W 10/06* (2013.01); *B60W 10/08* (2013.01); *B60W 10/188* (2013.01); *B60W 20/50* (2013.01); *Y10S 903/93* (2013.01); *Y10T 477/23* (2015.01); *Y10T 477/24* (2015.01); *Y10T 477/26* (2015.01)

(58) Field of Classification Search
None
See application file for complete search history.

(56) References Cited

U.S. PATENT DOCUMENTS

| | | | |
|---|---|---|---|
| 2004/0084234 A1 | 5/2004 | Yatabe et al. | |
| 2009/0288896 A1* | 11/2009 | Ichikawa | ............... B60K 6/445 180/65.265 |
| 2010/0004089 A1 | 1/2010 | Iwase et al. | |
| 2010/0070122 A1* | 3/2010 | Niimi | ..................... B60K 6/445 701/22 |
| 2011/0276213 A1 | 11/2011 | Tomatsuri | |
| 2012/0226401 A1 | 9/2012 | Naito | |
| 2012/0303194 A1 | 11/2012 | Muta | |
| 2014/0012443 A1* | 1/2014 | Bolenbaugh | ........... B60K 6/442 701/22 |
| 2015/0006065 A1* | 1/2015 | Yamamoto | ............. B60K 6/445 701/113 |

FOREIGN PATENT DOCUMENTS

| | | |
|---|---|---|
| JP | 2001-57705 A | 2/2001 |
| JP | 2006-187158 A | 7/2006 |
| JP | 2006-199077 A | 8/2006 |
| JP | 2009-184559 A | 8/2009 |
| JP | 2013-86695 A | 5/2013 |

OTHER PUBLICATIONS

Office Action issued Jan. 19, 2016 in the corresponding JP application No. 2014-021629 (with English translation).

* cited by examiner

*Primary Examiner* — Justin Holmes
(74) *Attorney, Agent, or Firm* — Posz Law Group, PLC (57) ABSTRACT

A Hybrid vehicle has an internal combustion engine, a first motor-generator, i.e., MG, a second MG, a battery section, and a control section. The control section performs first control which transmits power of the first MG to a drive shaft. The control section performs second control which starts the internal combustion engine by generating torque to the internal combustion engine using difference of rotational speeds of the first MG and the second MG, when the battery section fails while performing the first control. In the second control, the control section controls the second MG to generate electric power for driving the first MG. It is possible to provide a hybrid vehicle capable of starting the internal combustion engine even if the battery section becomes abnormal.

8 Claims, 10 Drawing Sheets

HYBRID VEHICLE

CROSS REFERENCE TO RELATED APPLICATION

This application is based on Japanese Patent Application No. 2014-21629 filed on Feb. 6, 2014, the disclosure of which is incorporated herein by reference.

TECHNICAL FIELD

The present disclosure relates to a hybrid vehicle that has an internal combustion engine and a motor-generator.

BACKGROUND

As shown in PLT1, it is proposed that a hybrid vehicle controller which allows a limp-home drive of the hybrid vehicle by using the internal combustion engine as a power source when an abnormality is detected on a motor-generator, i.e., a second motor-generator.

(Patent Literature) (PLT1) WO2010-82312A

SUMMARY

The hybrid vehicle controller in PLT1 allows a limp-home drive by using the internal combustion engine as a power source when an abnormality is detected on the second motor-generator. The internal combustion engine is usually started by a battery mounted on the hybrid vehicle. However, if the battery has an abnormality, the internal combustion engine may not be started. Therefore, if the battery gets an abnormality during the hybrid vehicle is driven as an electric vehicle, i.e., an EV-mode, the internal combustion engine may not be able to be started and it is impossible to keep driving.

It is an object of this disclosure to provide a hybrid vehicle which is capable of starting the internal combustion engine even if a battery gets an abnormality.

According to the disclosure, a hybrid vehicle is provided. The hybrid vehicle comprises an internal combustion engine which transmits drive power to a drive shaft, a first motor-generator which transmits drive power to the drive shaft, and a second motor-generator which generates electric power by drive power of the internal combustion engine.

The hybrid vehicle further comprises a battery section which stores electric power to be supplied to the first motor-generator and electric power for carrying out cranking of the internal combustion engine, and a control section which is capable of controlling torque of each of the first motor-generator, the second motor-generator, and the combustion engine. The hybrid vehicle further comprises a drive power splitter mechanism having a sun gear engaged with the second motor-generator, a planetary carrier engaged with the internal combustion engine, a ring gear engaged with the first motor-generator, and a pinion gear carried on the planetary carrier. The drive power splitter mechanism is rotated by meshing the ring gear and the sun gear via the pinion gear, so that a relationship of rotational speed of the first motor-generator, the second motor-generator and the internal combustion engine are expressed by a straight line on the collinear diagram. Rotation and torque propelling the hybrid vehicle forward are assumed as forward rotation and positive torque and opposite rotation and opposite torque are assumed as backward rotation and negative torque.

The control section includes a first control section and a second control section. Both sections control at least a part of the components above. The first control section performs a first control transmits only the drive power of the first motor-generator to the drive shaft while not starting the internal combustion engine by rotating the sun gear in the backward rotation while generating the positive torque on the ring gear and rotating the ring gear in the forward rotation. The second control section performs a second control which starts the internal combustion engine by carrying out cranking, in a case that the battery section fails while performing the first control, by generating the positive torque on the sun gear rotating in the backward rotation to generate electric power and rotating the first motor-generator by generated electric power, and generating the positive torque on the pinion gear by difference of rotational speeds between the sun gear and the ring gear.

According to the present disclosure, even if it becomes impossible to start the internal combustion engine by cranking using electric power of the battery section, the hybrid vehicle still possible to generate electric power, i.e., regenerative energy, by the second motor-generator and to rotate the first motor generator in the forward rotation by using generated electric power. In the second control, since positive torque can be generated on the pinion gear engaged with the internal combustion engine by using difference of rotational speeds between the sun gear engaged with the second motor-generator and the ring gear engaged with the first motor-generator, it is possible to perform cranking and start the internal combustion engine by using the positive torque.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, embodiments, which are a part of the disclosure, are described referring to the drawings.

First Embodiment

Figure 2:
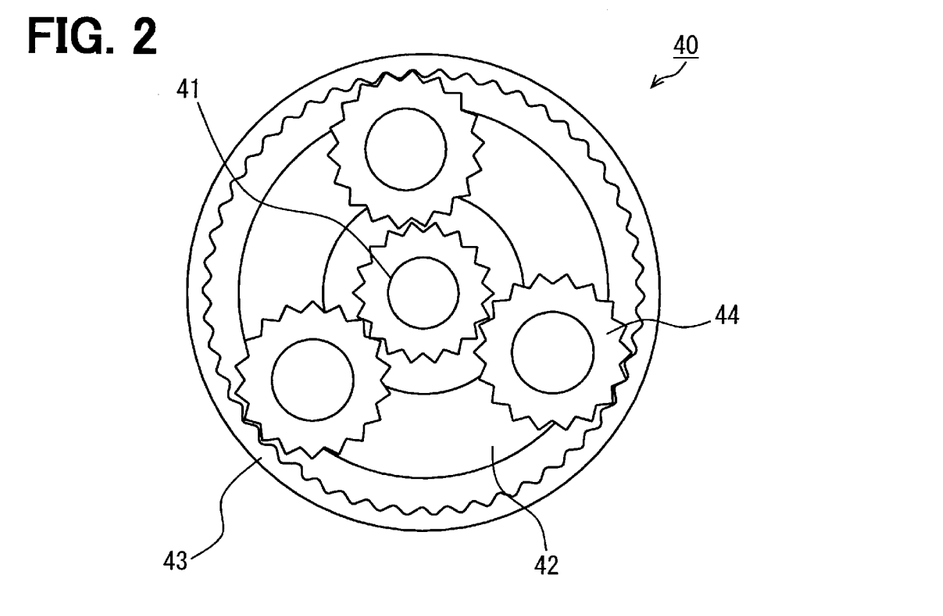
FIG. 2 is a general diagram showing a drive power splitter mechanism.
Figure 3:
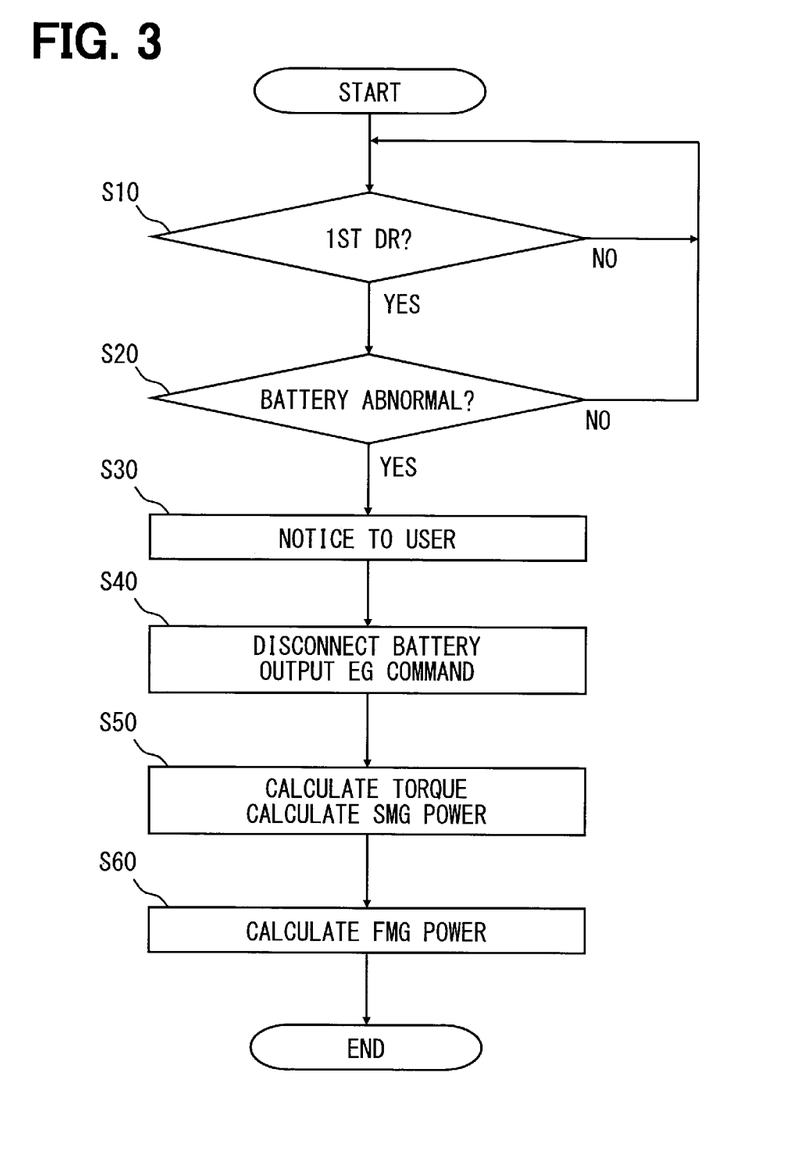
FIG. 3 is a flowchart showing a second control.
Figure 4:
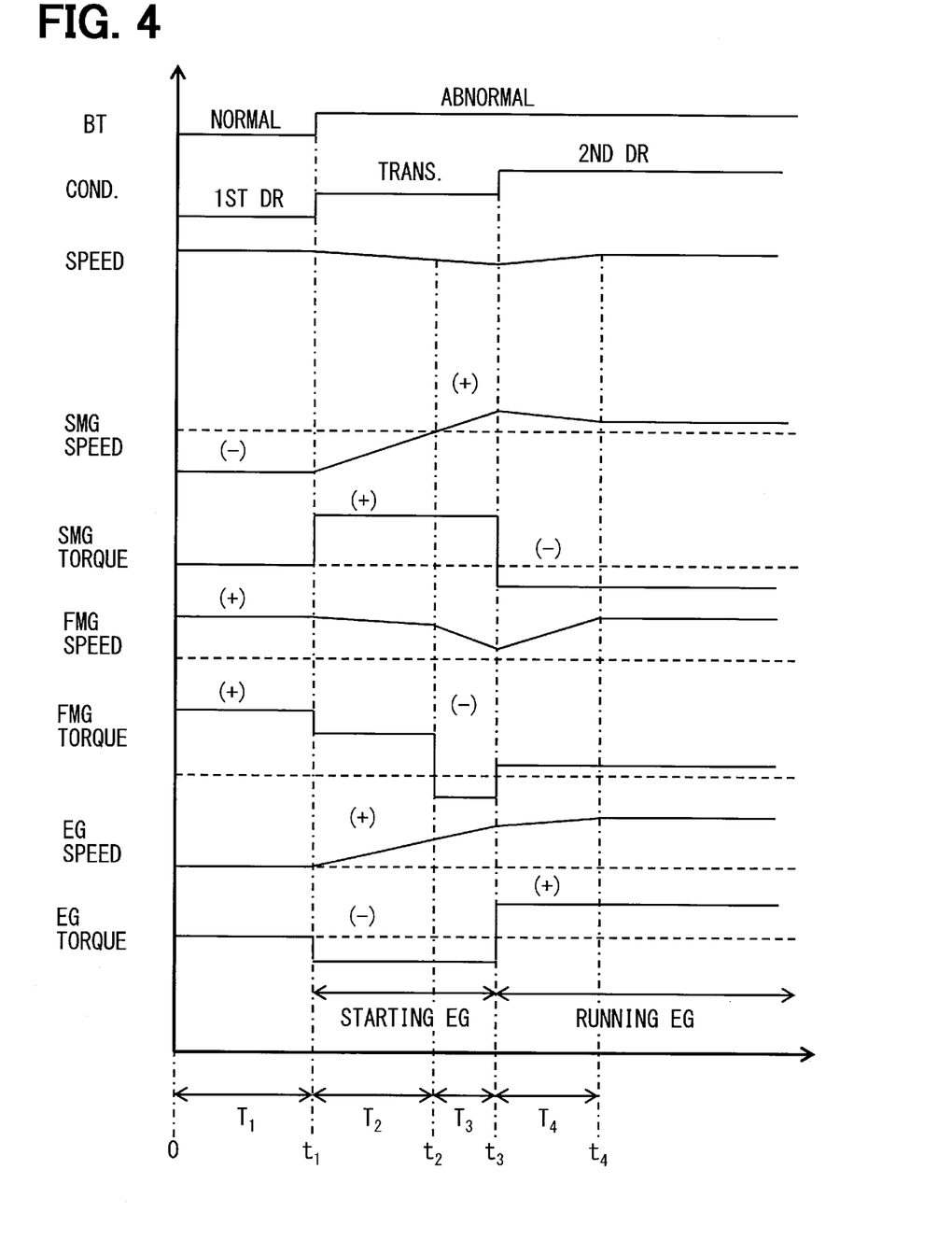
FIG. 4 is a timing diagram showing transition from a first drive mode to a second drive mode.

A hybrid vehicle in this embodiment is described referring to FIGS. 1-8. In the following description, rotation and torque propelling the hybrid vehicle forward are assumed as forward rotation and positive torque. Opposite rotation and opposite torque are assumed as backward rotation and negative torque. In the drawings, forward rotation and positive torque are indicated by symbols (+), i.e., plus. Backward rotation and negative torque are indicated by symbols (−), i.e., minus. In FIG. 4, a broken line shows zero of rotational speed and torque. In FIGS. 5-8, arrows show torque.

Figure 1:
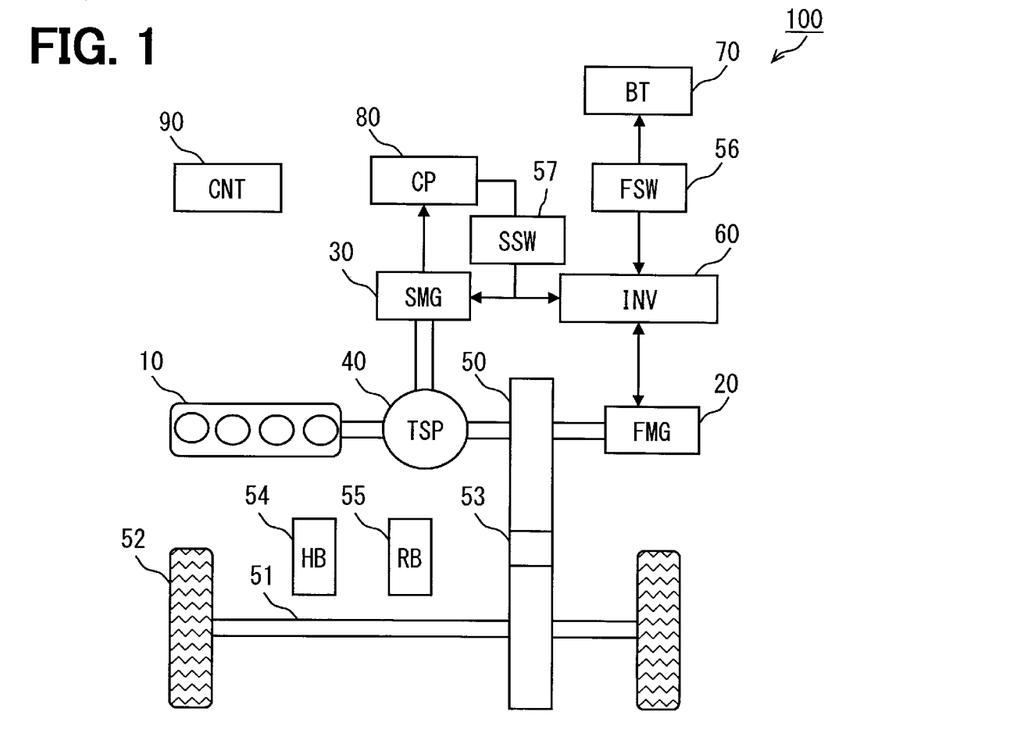
FIG. 1 is a block diagram showing a general arrangement of a hybrid vehicle according to a first embodiment.

As shown in FIG. 1, a hybrid vehicle 100 has source of power. The source of power has an internal combustion engine (hereafter referred to as an engine) 10, a first motor-generator (FMG) 20, and a second motor-generators (SMG) 30. The hybrid vehicle 100 has a power splitter mechanism (TSP) 40 which splits and distributes power. The engine 10 is an engine which generates drive power by combusting fuel. On the other hand, FMG 20 and FMG 30 both has function to generate drive power by rotation of itself, and function to generate electric power by rotation of itself. Drive power supplied from the engine 10, FMG 20 and SMG 30 is divided and distributed by TSP 40 for propelling the hybrid vehicle and generating electric power at the FMG 20 or SMG 30.

The hybrid vehicle 100 has the following base elements other than the compositions 10, 20, 30, and 40 mainly in connection with drive power. The hybrid vehicle 100 has a speed reduction mechanism 50, a drive shaft 51, a driving wheel 52, and a clutch 53. The hybrid vehicle 100 has a hydraulic brake (HB) 54, and a regenerative brake (RB) 55. The hybrid vehicle 100 has an inverter (INV) 60, a battery section (BT) 70, a capacitor section (CP) 80, and a control section (CNT) 90. TSP 40 is connected with the speed reduction mechanism 50. The speed reduction mechanism 50 is connected to the driving wheel 52 through the drive shaft 51. Therefore, drive power distributed to the speed reduction mechanism 50 by TSP 40 is transmitted to the driving wheel 52 through the drive shaft 51, whereby the hybrid vehicle 100 can be propelled.

The battery section 70 is electrically connected with FMG 20 and SMG 30 through the inverter 60. Electric power supplied from the battery section 70 is supplied to FMG 20 and SMG 30 by the inverter 60, and FMG 20 and SMG 30 are rotated. On the contrary, electric power generated in FMG 20 and SMG 30 may be supplied to the battery section 70 through the inverter 60, and the battery section 70 is charged. In this embodiment, FMG 20 and SMG 30 are electrically connected via the capacitive section 80 and the inverter 60. This arrangement enables inter-MG-electric-connection in which FMG 20 can be rotated by electric power generated by SMG 30. The inverter 60 is controlled by the control section 90. The control section 90 may controls FMG 20 and SMG 30 into a drive power generating mode or an electric power generating mode, respectively. The hybrid vehicle 100 has a clutch 53 which adjusts transmitting condition of drive power to the drive shaft 51 from TSP 40. The hydraulic brake 54 and the regenerative brake 55 supply braking power for slowing down the hybrid vehicle 100.

The engine 10 generates drive power by combusting fuel, and outputs the drive power to TSP 40. Although not illustrated, the engine 10 has at least one cylinder, piston, injector, spark plug, and crankshaft. A combustion chamber is formed by the cylinder and the piston and mist of fuel is injected into the combustion chamber by the injector. The spark plug generates igniting spark in the combustion chamber. When fuel mist is injected into the combustion chamber, igniting spark is generated and fuel is ignited and combusted in the combustion chamber. A piston moves up and down by volume expansion of gas in the combustion chamber by the combustion, compression, intake of air into the combustion chamber, and exhaust to out of the combustion chamber. The motion of the piston is converted into rotational motion by the crankshaft. This rotational motion is transmitted to TSP 40 as drive power. The crankshaft is engaged with a planetary carrier 42 of TSP 40 mentioned later, and the planetary carrier 42 is rotated by the crankshaft. On the contrary, when the engine 10 is not active itself, cranking operation on the crankshaft may be carried out by using rotation of the planetary carrier 42. Cranking of the crankshaft at a start up of the engine 10 is performed by rotation of the planetary carrier 42.

Each of FMG 20 and SMG 30 has both the drive power generating function and the electric power generating function as mentioned above. FMG 20 is engaged with the drive shaft 51. SMG 30 generates electric power by using drive power of the engine 10.

As shown in FIG. 2, TSP 40 has a sun gear 41, a planetary carrier 42, a ring gear 43, and at least one pinion gear 44. The sun gear 41 is engaged with SMG 30. The planetary carrier 42 is engaged with the engine 10. The ring gear 43 is engaged with the FMG 20. The pinion gear 44 is connected with the planetary carrier 42. TSP 40 is rotated by meshing the ring gear 43 and the sun gear 41 via the pinion gear 44. TSP 40 is rotated so that a relationship of rotational speeds of the sun gear 41, i.e., SMG 30, the planetary carrier 42, i.e., the engine 10, and the ring gear 41, i.e., FMG 20, are expressed by a straight line on the collinear diagram. Hereafter, a detailed configuration of TSP 40 is explained referring to FIG. 2.

As shown in FIG. 2, the sun gear 41 and the pinion gear 44 have circular shapes and has tooth on circumferential surfaces. On the other hand, the ring gear 43 has circular ring shape and tooth on an inner circumferential surface. The sun gear 41 is arranged on a center of region surrounded by the inner circumferential surface of the ring gear 43. The pinion gear 44 if disposed between the sun gear 41 and the ring gear 43 to mesh with both gears. In this arrangement, the ring gear 43 and the sun gear 41 are meshed via the pinion gear 44. When one of three gears receives torque to rotate, due to this torque remaining two gears also receives torque in rotating direction respectively.

For example, in a case that positive torque is generated on the ring gear 43 and the ring gear 43 rotates in the forward rotation by the positive torque, in connection with this, the pinion gear 44 rotates in forward rotation, and sun gear 41 rotates in backward rotation. However, since no torque is generated on the the sun gear 41, the pinion gear 44 merely rotates itself and does not revolve around the sun gear 41 like an orbital motion. That is, the planetary carrier 42 connected with the pinion gear 44 does not rotate. This is a behavior of TSP 40 at the time of a first drive mode shown in FIG. 4.

However, if positive torque (braking torque) is generated on the sun gear 41 during a condition that the ring gear 43 rotates in forward rotation by positive torque and the sun gear 41 rotates in backward rotation, the backward rotation of the sun gear 41 is weakened, then, positive torque is generated on the pinion gear 44 due to a rotational speed difference between the sun gear 41 and the ring gear 43. By this, the pinion gear 44 begins to revolve around the sun gear 41. That is, the planetary carrier 42 connected with the pinion gear 44 also begins to rotate. Since the planetary carrier 42 is engaged with the crankshaft as described above, cranking of the crankshaft is carried out as the planetary carrier 42 rotates. This is the behavior of TSP 40 at the time of the transitional mode shown in FIG. 4. If a rotational speed of the crankshaft exceeds a predetermined speed, fuel is injected by the injector and the spark plug generate spark to ignite fuel, then, the engine 10 is started.

If positive torque is generated by the planetary carrier 42 by starting the engine 10, the planetary carrier 42 begins to rotate in the forward rotation. Then, the ring gear 43 rotates in forward rotation, and the sun gear 41 also rotates in forward rotation. At this time, if positive torque is generated on the ring gear 43, drive torque generated by the engine 10 and FMG 20 is transmitted to the drive shaft 51. When the sun gear 41 rotates in forward rotation by the engine 10, if negative torque is generated on the sun gear 41, SMG 30 may perform electric power generation and the generated electric power may be supplied to the inverter 60. The electric power supplied to the inverter 60 may be used for a purpose to generate positive torque on FMG 20. This is the behavior of TSP 40 at the time of the second drive mode shown in FIG. 4. This is the behavior of TSP 40 when the battery section 70 is having a failure.

The above-mentioned behavior of TSP 40 is a behavior when a failure happens in the battery section 70. On the other hand, when the battery section 70 is in normal condition, if a negative torque generated on the ring gear 43 during the ring gear 43 rotates in forward rotation by forward rotation of the planetary carrier 42, only drive power generated by the engine 10 is transmitted to the drive shaft 51, and FMG 20 generates electric power. Electric power generated is supplied to the battery section 70 through the inverter 60, and the battery section 70 is charged. When the sun gear 41 is rotated in forward rotation by the engine 10, if negative torque is generated on the sun gear 41, SMG 30 performs electric power generation, and generated electric power supplied to the inverter 60. Electric power supplied to the inverter 60 is utilized for charging the battery section 70, or for generating positive torque on FMG 20.

The inverter 60 has AC-DC transform function and DC-AC transform function. In the DC-AC transform function, the inverter 60 transforms DC power supplied from the battery section 70 into AC power. In the AC-DC transform function, the inverter 60 transforms AC power supplied from the FMG 20 or SMG 30 into DC power. The inverter 60 has a plurality of transistor devices. The control section 90 controls the transistor devices to generate positive torque or negative torque on FMG 20 and/or SMG 30. As shown in FIG. 1, in this embodiment, SMG 30 and the inverter 60 are electrically connected through the capacitive section 80. Electric power generated in SMG 30 may be temporarily stored in the capacitive section 80, and stored electric power may be supplied to the inverter 60. Thereby, the electric circuit of the hybrid vehicle 100 is configured that the inverter 60 can handle both electric power supplied from the battery section 70 and electric power supplied from SMG 30. In other words, the inverter 60 can operate FMG 20 to generate torque by using not only electric power supplied from the battery section 70 but also electric power supplied from SMG 30.

As shown in FIG. 1, the inverter 60 and the battery section 70 are electrically connected through a first switch device (FSW) 56. The first switch device 56 is controlled by the control section 90. The first switch device 56 turns to ON condition when the battery section 70 is in normal condition and electrically connects the inverter 60 and the battery section 70. However, the first switch device 56 turns to OFF condition when a failure occurs in the battery section 70, and shuts down the electric connection between the inverter 60 and the battery section 70. In other words, the electrical connection between the battery section 70 and MG 20 and MG 30 can be shut down.

The inverter 60 and the capacitive section 80 are electrically connected through a second switch device (SSW) 57. The second switch device 57 is controlled by the control section 90. The second switch device 57 turns to OFF condition when the battery section 70 is in normal condition, and shuts down the electric connection between the inverter 60 and the capacitive section 80. However, when a failure occurs in the battery section 70, the second switch device 57 turns to ON condition and electrically connects the inverter 60 and the capacitive section 80.

This configuration allows the hybrid vehicle 100 to establish a single electric power supply connection among the inverter 60 and two power charging devices 70 and 80. In case that the battery section 70 is in normal condition, electric power generated in the battery section 70 is supplied to the inverter 60. In a case that a failure occurs in the battery section 70, electric power generated in SMG 30 is supplied to the inverter 60 through the capacitive section 80. In a case that the battery section 70 is in normal condition, electric power generated in SMG 30 may be directly supplied to the inverter 60, without passing the capacitive section 80. Therefore, it is possible to reduce time delay which may be caused by the capacitive section 80 in electric power supply.

The battery section 70 supplies direct-current electric power to the inverter 60. In a case that the battery section 70 is in normal condition, the control section 90 controls the inverter 60 so that FMG 20 and/or SMG 30 generates torque by electric power supplied from the battery section 70, and rotates, and performs cranking of the engine 10 at a time of start of the engine 10. The battery section 70 stores electric power which may be supplied to FMG 20 and may be used for carrying out cranking of the engine 10.

The capacitive section 80 stores electric power generated by SMG 30 when the battery section 70 fails. The capacitive section 80 stores electric power generated in SMG 30 temporarily, and contributes to stabilize electric power supplied to the inverter 60.

The control section 90 is capable of controlling rotational speed and torque of each of the engine 10, FMG 20, and SMG 30, respectively. The control section includes a first control section and a second control section. Both sections control at least a part of the components above. The first control section performs a first control. The second control section performs a second control. Therefore, the control section 90 performs the first control and the second control.

In the first control, the control section 90 controls the hybrid vehicle 100 to a first drive mode, i.e., a first drive condition by using only drive power of FMG 20. The control section 90 performs the second control when the battery section 70 fails. In the second control, the control section 90 controls the hybrid vehicle 100 to a second drive mode, i.e., a second drive condition by starting the engine 10 and by using drive power of the engine 10. The second drive mode may also be referred to as a limp-home drive condition. In the limp-home drive condition, a user may still drive the hybrid vehicle 100, but the user may be restricted to use certain vehicular function.

In the second control, the control section 90 controls FMG 20 and SMG 30 to keep balance of output power, which may be defined by torque and rotational speeds of FMG 20 and/or SMG 30, respectively, in a certain condition. Thereby, the control section 90 maintains a relationship of straight lines in the collinear diagram as shown in FIGS. 5-8. As a result, the control section 90 controls the above-mentioned devices to perform cranking and start the engine 10. In order to keep the balance of the output of FMG 20 and SMG 30 in the certain condition, the control section 90 calculates an output of SMG 30, and controls an output of FMG 20 to coincide with a value which has an inverted positive and negative sign and value of the calculated output of SMG 30.

FIG. 1 also shows a control system. The controller in this control system is an electronic control unit (ECU). The controller has at least one processing unit (CPU) and at least one memory as a storage medium which stores and memorizes a program and data. The controller is provided by a microcomputer which has a storage medium which can be read by computer. The storage medium is a non-transitory storage medium which stores a program readable by the computer. The storage medium may be provided by tangible medium, such as a semiconductor memory or a magnetic disc. The controller may be provided with a computer or a set of computer resources linked by a data communication device. The program, when the controller executes the program, makes the controller to function as the apparatus described in this specification, and makes the controller to function to perform methods, such as control method, described in this specification.

The control system has a plurality of signal sources which supply signal indicative of information to be inputted into the controller as input devices. The control system inputs and retrieves information as the controller stores information in the memory device. The control system has a plurality of control objects of which behavior is controlled by the controller as output devices. The control system controls the behavior of the control object by transforming information stored in the memory device into signal, and supplying the signal to the control object. The control system provides various components. At least a part of the components may be referred to as means for performing function, and from the other viewpoint, at least a part of the components may be referred to as block or module each may be interpreted as a structural element.

Means and/or functions of the control device may be provided by a system including software stored in a tangible memory device and a computer executing the software, only software, only hardware or a combination of the software and the hardware. For example, in a case that a control system is provided by an electronic circuit, i.e., hardware, which may be provided by a digital circuit containing logic circuits or an analog circuit.

Hereafter, the first and second controls are explained in detail referring to FIG. 3. The first control section is provided by loops provided by steps S10 and S20. The second control section is provided by steps S20-S60.

As shown in FIG. 3, the control section 90 determines whether the hybrid vehicle 100 is in the first drive mode (1stDr) or not, at a step S10. In a case that it is determined that the hybrid vehicle 100 is not in the first drive mode, the control section 90 repeats step S10. In a case that it is determined that the hybrid vehicle 100 is in the first drive mode, the control section 90 advances the process to a step S20.

In the step S20, the control section 90 determines whether the battery section 70 fails or not. The control section 90 may detect abnormalities of the battery section 70 to determine a failure on the battery section 70. In a case that it is determined that no abnormality occurs in the battery section 70, the control section 90 returns the process to the step S10. In a case that it is determined that an abnormality occurs in the battery section 70, the control section 90 advances the the process to a step S30.

In the step S30, the control section 90 generates signal to notice a user about the abnormality occurring in the battery section 70. In addition, the control section 90 also generates signal to notice the user that the control section 90 controls the hybrid vehicle 100 to turn the drive mode of the hybrid vehicle 100 from the first drive mode to the second drive mode. Then, the control section 90 advances the process to a step S40. Here, notice to the user may be performed by using a visual and/or audio signal, such as displaying an image and/or generating sound.

In the step S40, the control section 90 turns the first switch device 56 to the OFF condition to shut down the electric connection between the inverter 60 and the battery section 70. The control section 90 also turns the second switch device 57 to the ON condition to electrically connect between the inverter 60 and the capacitive section 80. Thereby, electric power supply from the failed battery section 70 to the inverter 60 is terminated. Also, the circuit is switched to condition in which electric power generated in SMG 30 can be supplied to inverter 60 via the capacitive section 80. The control section 90 outputs and transmits an engine start command (EG command) to the engine 10. In detail, the control section 90 transmits command signals for starting fuel injection by the injector and ignition spark by the spark plug to an engine controller, not shown. The control section 90 advances the process to a step S50. In this embodiment, electric power required for the above-mentioned fuel injection and spark ignition is supplied to the engine 10 from a battery other than the battery section 70. For example, the battery section 70 is a high voltage and large capacity battery. The basic components on the engine 10 are supplied electric power by a low voltage battery.

In the step S50, the control section 90 calculates torque which is necessary for starting up the engine 10. In a case of the step S50, since the battery section 70 fails, the torque, i.e., electric power, necessary for starting up the engine 10 is generated in SMG 30. The control section 90 calculates an output of SMG 30 necessary for starting up the engine 10 based on the torque mentioned above and a rotational speed of SMG 30. Here, the output may be calculated by multiplying the rotational speed and the torque, i.e., Output=rotational speed×torque. The control section 90 advances the process to a step S60.

Figure 6:
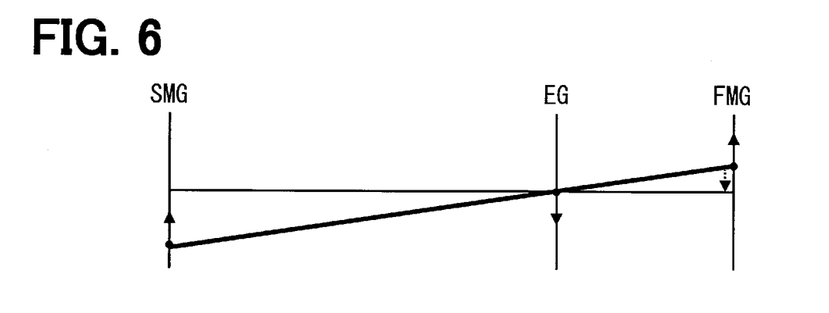
FIG. 6 is a collinear diagram of rotational speeds at a second period T2.

In the step S60, the control section 90 calculates the output of FMG 20 necessary for starting up the engine 10. As shown in FIG. 6, the control section 90 controls rotational speeds to maintain straight line, i.e., a linear connection on the collinear diagram. However, when the engine 10 is not active, the rotational speed of FMG 20 and the rotational speed of SMG 30 are opposite, and absolute values of those speeds equivalent to values obtained by dividing output by torque. Therefore, the control section 90 calculates the output of FMG 20 by inverting positive and negative sign of the output of SMG 30 calculated in the step S50. The control section 90 controls FMG 20 and SMG 30 to generate torque respectively by using the calculated output and torque and to perform cranking and starting of the engine 10. The control section 90 performs the second control, i.e., S10-S60, until the engine 10 is started and the hybrid vehicle 100 reaches to the second drive mode.

In the second control, the control section 90 shuts down transmitting of drive power to the drive shaft 51 by cutting the clutch 53. The control section 90 adjusts a ratio of braking power between the hydraulic brake 54 and the regenerative brake 55. The control section 90 varies and differentiates the ratio of braking power in the first control and the second control. The control section 90 adjusts the ratio to increase a share of the regenerative brake 55 more than a share of the regenerative brake 55 in the first control, when SMG 30 rotates in the forward rotation in the second control. The control section 90 adjusts the ratio to increase a share of the hydraulic brake 54 more than a share of the hydraulic brake 54 in the first control when SMG 30 rotates in the backward rotation in the second control.

Hereafter, transition, i.e., migration, from the first drive mode to the second drive mode is explained referring to FIGS. 4-8. A time period from t0 (0) to t2 is referred to as a first period T1, a time period from t1 to t2 is referred to as a second period T2, a time period from t2 to t3 is referred to as a third period T3, and a time period from t3 to t4 is referred to as a fourth period T4, as shown in FIG. 4. In the first period T1, the battery section 70 is in normal condition. A something abnormal occurs on the battery section 70 at time t1, which is the same as the end of the first period T1 and the start of the second period T2. The battery section 70 is continuously in abnormal condition on and after the second period T2. The hybrid vehicle 100 is in the first drive mode in the first period T1. The hybrid vehicle 100 is in the transitional drive mode from the second period T2 to the third period T3. The engine 10 is started at time t3 which is the end of the third period T3 and the beginning of the fourth period. The hybrid vehicle 100 is in the second drive mode, i.e., the limp-home drive mode, on and after the fourth period T4.

The periods T2 and T3 are a time period for starting the engine 10, so called an engine starting period. On and after the fourth period T4 is an operating period of the engine 10.

Figure 5:
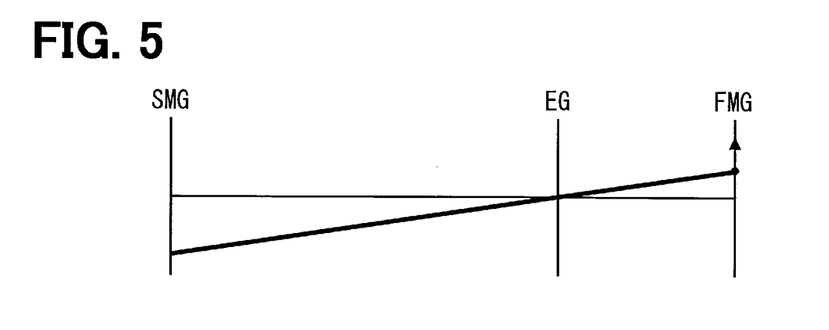
FIG. 5 is a collinear diagram of rotational speeds at a first period T1.

As shown in FIGS. 4 and 5, the control section 90 controls FMG 20 to generate positive torque by itself alone and also controls SMG 30 to rotate in backward rotation in the first period T1. Thereby, only drive power of FMG 20 is transmitted to the drive shaft 51 without activating the engine 10. As a result, the hybrid vehicle 100 is controlled to the first drive mode. This is the above-mentioned first control.

In a case that something abnormal condition occurs on the battery section 70 at time t1, which is the beginning of the second period T2, the control section 90 initiates and performs the second control. The control section 90 calculates torque, i.e., output power, necessary for starting the engine 10, and controls components to generate the calculated torque, which is necessary to execute the engine start, on SMG 30. The control section 90 controls SMG 30 in backward rotation to generate electric power, i.e., regeneration energy, by controlling SMG 30 to generate positive torque, i.e., braking torque, and controls FMG 20 to rotate FMG 20 in forward rotation by using generated electric power. As described above, SMG 30 is engaged with the sun gear 41, FMG 20 is engaged with the ring gear 43, and the engine 10 is engaged with the planetary carrier 42. The planetary carrier 42 is connected to the pinion gear 44 which is meshed with both gears 41 and 43. Therefore, if positive torque, i.e., braking torque, is generated on SMG 30 in conditions where FMG 20 is in forward rotation by positive torque and SMG 30 is in backward rotation as shown in FIG. 6, the backward rotation on SMG 30 is weakened and positive torque is generated and applied on the engine 10 due to a difference of rotational speeds between SMG 30 and FMG 20. As a result, the crankshaft is rotated to carry out cranking on the engine 10.

As shown FIGS. 4 and 6, the vehicle speed decreases in the second period T2 due to transitional process from the first drive mode to the second drive mode. Rotational speed of SMG 30 in backward rotation is decreased due to the braking torque, and FMG 20 tends to maintain forward rotation due to the regenerative energy generated by SMG 30. However, negative torque, which is shown by a broken-line-arrow in FIG. 6, is generated on FMG 20 due to the braking torque of SMG 30, and then, rotational speed of FMG 20 decreases. In this condition, the engine 10 begins forward rotation, i.e., cranking, but the engine 10 still generates negative torque due to friction therein. Therefore, the engine 10 is still in a starting mode, and is not reached to a self-running mode. As supplemental description about the vehicle speed, behavior of the vehicle speed in the second period T2 depends on driving condition of the vehicle, such as road inclinations, road surface conditions, and opening degree of a gas pedal. Therefore, the vehicle speed may not be decreased even in the second period due to those driving conditions.

Figure 7:
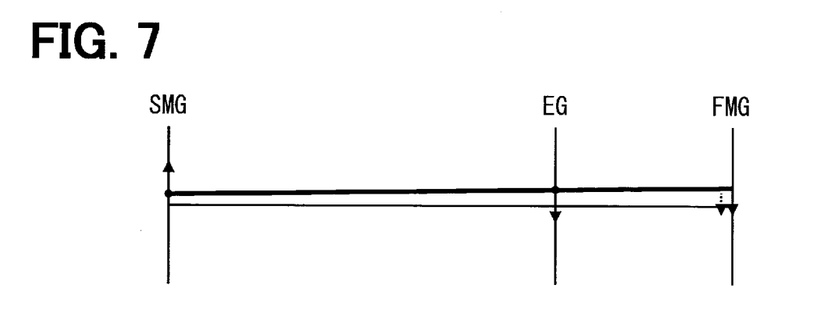
FIG. 7 is a collinear diagram of rotational speeds at a third period T3.

As shown in FIGS. 4 and 7, as backward rotation of SMG 30 is weakened, then, SMG 30 turns into forward rotation. This transition from backward rotation to forward rotation occurs at the second time t2 which is the beginning of the third period T3. Since the transitional condition still continues in the third period T3, the vehicle speed decreases continuously. Since SMG 30 rotates in forward rotation and the straight line relationship on the collinear diagram is maintained, therefore, negative torque is generated on FMG 20 and forward rotation of FMG 20 is weakened continuously. In this condition, the rotational speed of the engine 10 is increased, but the engine 10 is not reached to the self-running mode, where the engine 10 runs continuously by combusting fuel without external rotation assist torque.

Figure 8:
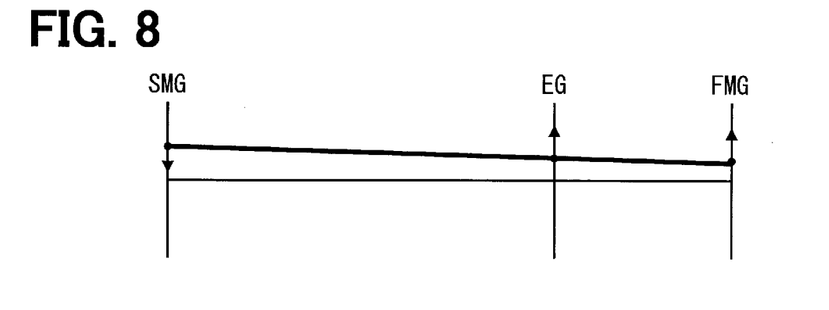
FIG. 8 is a collinear diagram of rotational speeds at a fourth period T4.

Then, the rotational speed of the engine 10 exceeds a predetermined threshold value, the control section 90 output engine command signal to activate the injector to inject fuel and activate the spark plug to generate ignition spark. Thereby, fuel combustions in the combustion chamber begin and the engine 10 is started. Starting the engine 10 is completed at the third time t3 which is the beginning of the fourth period T4. Thereby, the hybrid vehicle 100 can be in the second drive mode on and after the fourth period T4. As shown in FIGS. 4 and 8, positive torque is generated on the engine 10 by fuel combustions and the rotational speed of the engine 10 increases. As a result, the vehicle speed begins to increase with drive power from the engine 10. At this time, negative torque is generated on SMG 30, and forward rotation is weakened. However, even in this situation, regenerative energy is generated in SMG 30, and positive torque is generated on FMG 20 by using this generated regenerative energy, i.e., electric power. FMG 20 rotates in forward rotation together with the engine 10, and transmits drive power to the driving wheel 52.

When it is reached to the fourth time t4 which is the end of the fourth period T4, driving condition of the hybrid vehicle 100 becomes stable condition, and torque and rotational speeds of the engine 10, FMG 20, and SMG 30 become stable condition respectively. Thereby, the hybrid vehicle 100 completes transition, i.e., transitional drive mode, from the first drive mode to the second drive mode. Although, in FIG. 4, there is a part where torque is shown by a horizontally extending straight line, since this just shows behavior in a schematic manner, this part does not show that torque is constant.

Next, advantages of the hybrid vehicle 100 according to this embodiment are explained. As mentioned above, even if it becomes impossible to start the engine 10 by cranking the engine 10 by using electric power supplied from the battery section 70, the hybrid vehicle 100 still possible to generate electric power, i.e., regenerative energy, by SMG 30, and to rotate FMG 20 in forward rotation by using generated electric power by SMG 30. In this second control, positive torque is generated on the pinion gear 44 which is engaged with the engine 10 by a difference of rotational speed of the sun gear 41 engaged with SMG 30 and rotational speed of the ring gear 43 engaged with FMG 20. Therefore, it is possible to start the engine 10 by cranking the engine 10 by using the positive torque acting on the pinion gear 44. In other words, in the second control, since positive torque for rotating the planetary carrier 42 in forward rotation is generated by positive torque, i.e., braking torque, on the sun gear 41 and forward rotation of the ring gear 43 due to regenerative energy, the engine 10 can be driven by cranking and can be started.

The control section 90 shuts down electric connection between the battery section 70 and SMG 30, and electric connection between the battery section 70 and FMG 20 respectively. Thereby, it is possible to reduce adverse result caused by charge and discharge operation on failed battery section 70.

The hybrid vehicle 100 has the capacitive section 80 which can stores electric power generated in SMG 30 when the battery section 70 is failed. Thereby, even if the battery section 70 is failed, it is possible to actively rotate FMG 20 in a stable rotating manner by using electric power generated by SMG 30.

As described above, the control section 90 performs control which rotates FMG 20 in forward rotation by generating positive torque on FMG 20 in order to start the engine 10 in the second control. Adversely, there is a possibility that the vehicle speed may be increased, irrespective of user operation of acceleration and/or deceleration. To avoid such an adverse result, the control section 90 disconnects drive power transmission to the driving wheel 51 by disconnecting the clutch 53 in the second control. Thereby, an increase of the vehicle speed irrespective of user operation of acceleration and/or deceleration can be reduced by forward rotation of FMG 20 in the second control.

The control section 90 adjusts a ratio of braking power between the hydraulic brake 50 and the regenerative brake 55 so that a share of the regenerative brake 55 when SMG 30 rotates in forward rotation in the second control is increased more than a share of the regenerative brake 55 in the first control. According to this arrangement, it is possible to start the engine 10 by compensating kinetic energy lost by user operation depressing a brake pedal by using regenerative energy.

The control section 90 adjusts a ratio of braking power between the hydraulic brake 54 and the regenerative brake 55 so that a share of the hydraulic brake 54 when SMG 30 rotates in the backward rotation in the second control more than a share of the hydraulic brake 54 in the first control. According to this arrangement, in a case that the clutch 53 is not disconnected, even if the vehicle speed is increased by forward rotation of FMG 20 in the second control, it is possible to slow down the vehicle speed efficiently.

Second Embodiment

A second embodiment is described referring to FIGS. 9-16. The hybrid vehicle in this second embodiment has many components common to the above-mentioned embodiment. Therefore, descriptions for common components are omitted and different components are mainly explained in the following description. The same components described in the above-mentioned embodiment are indicated by the same reference numbers.

Figure 9:
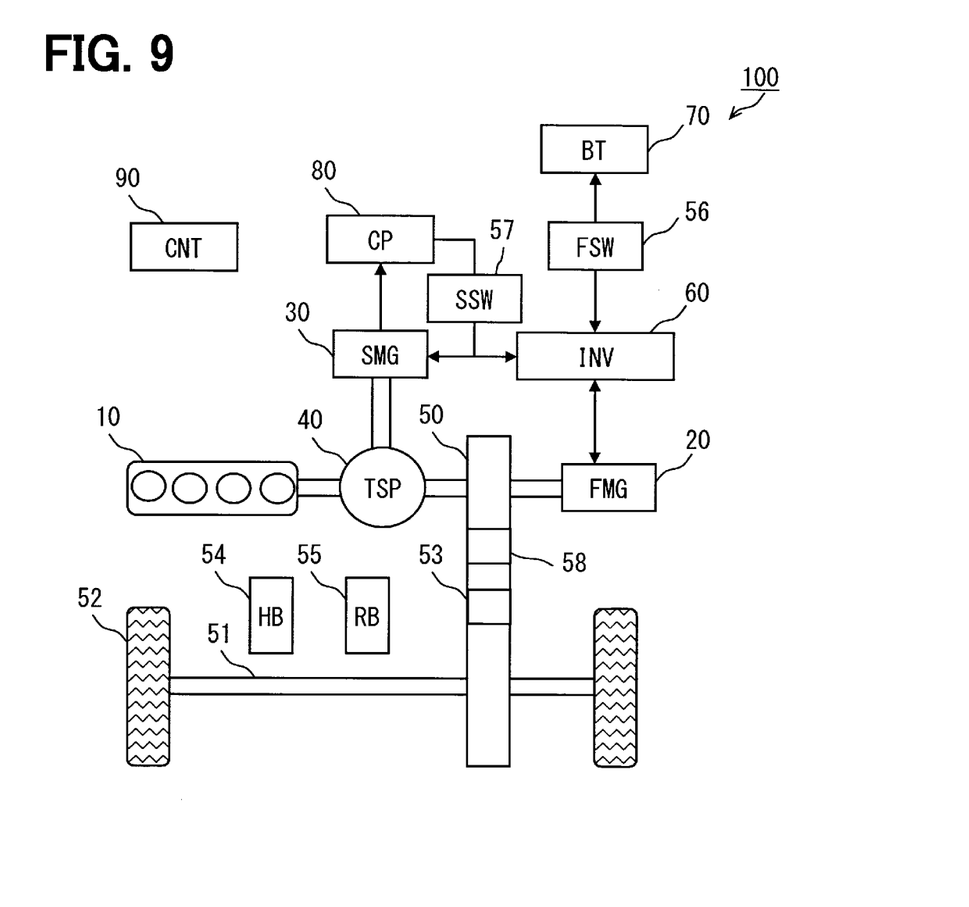
FIG. 9 is a block diagram showing a general arrangement of a hybrid vehicle according to a second embodiment.

In addition to the above-mentioned embodiment, in this embodiment, the hybrid vehicle 100 further has a transmission 58 which adjusts a rotational speed ratio between FMG 20 and the driving wheel 52. The transmission 58 can adjust the speed ratio into four ranges, e.g., including a first range, a second range, a third range and a fourth range, in a speed ascending order. The transmission 58, i.e., the speed ratio, is controlled by the control section 90. The control section 90 controls the transmission 58 so that the transmission 58 controls the rotational speed ratio between FMG 20 and the driving wheel 52 so as to hinder transition from the backward rotation to the forward rotation before SMG 30 transits from the backward rotation to the forward rotation in the second control, i.e., when the battery section 70 fails. The control section 90 controls the transmission 58 to increase a rotational speed of FMG 20.

Figure 10:
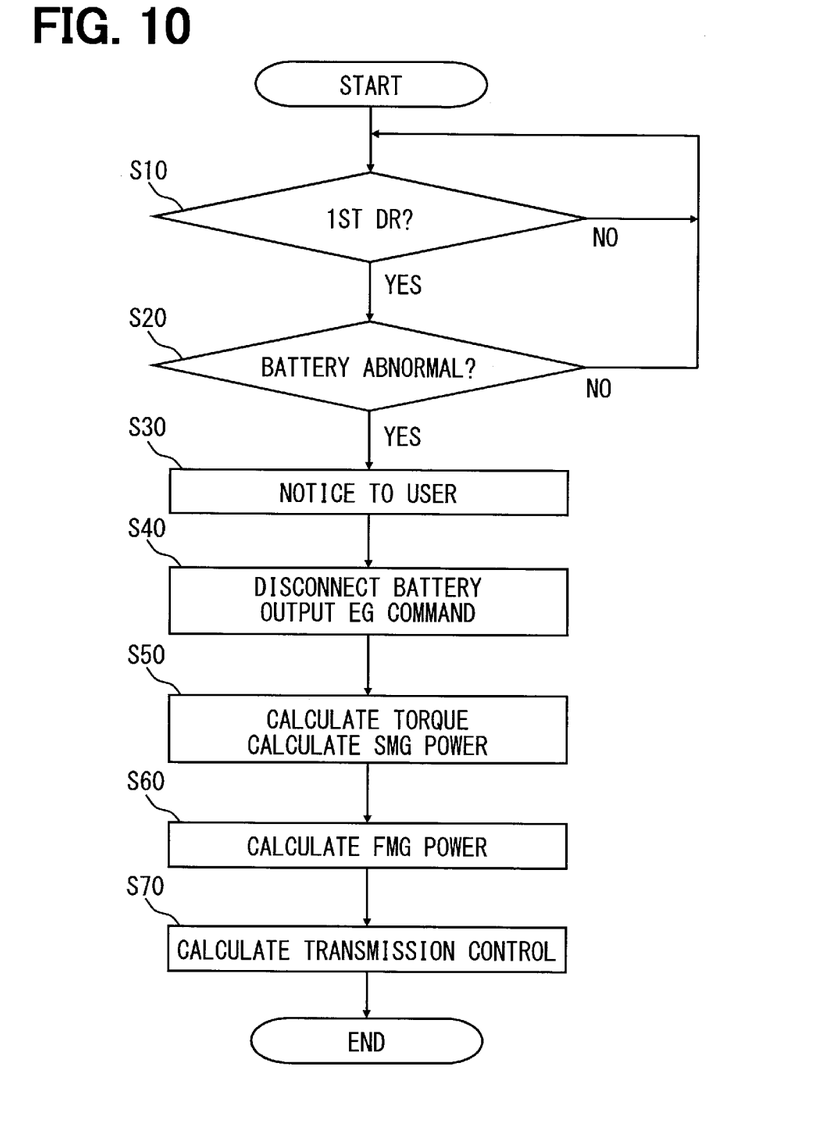
FIG. 10 is a flowchart showing a second control.

As shown in FIG. 10, the control section 90 performs step S70 in the second control in addition to steps S10-S60 in the first embodiment. That is, the control section 90 performs calculating process for a transmission control command after step S60.

Figure 11:
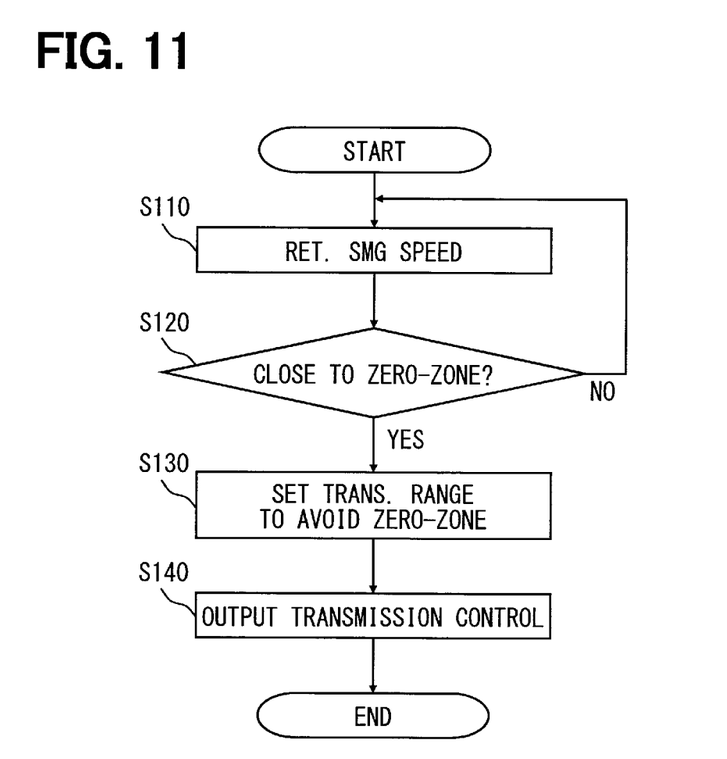
FIG. 11 is a flowchart showing process of calculating transmission control command.

FIG. 11 may show a detail of calculating process for a transmission control command. The control section 90 inputs and retrieves rotational speed of SMG 30 at step S110.

As process advances to step S120, the control section 90 determines that whether rotational speed of SMG 30 is close to a zero or not, i.e., close to a zero-zone or not. In other words, the control section 90 determines that whether the SMG 30 is in just before a transition from backward rotation to forward rotation. The control section 90 returns to step S110 again, if SMG 30 is not in just before the transition from backward rotation to forward rotation. Contrary, if it is determined that SMG 30 is in just before the transition, the control section 90 advances to step S130.

Figure 12:
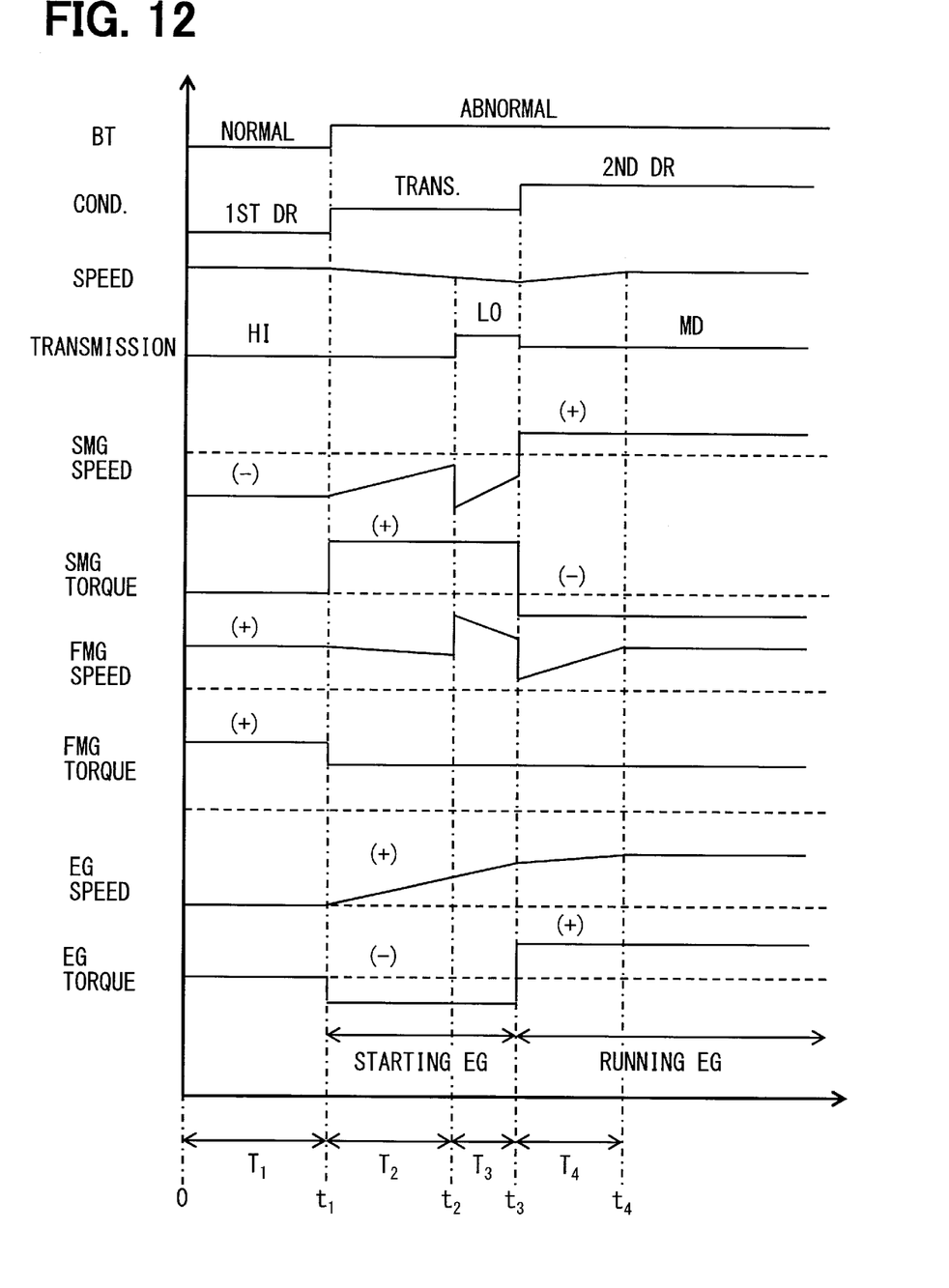
FIG. 12 is a timing diagram showing transition from a first drive mode to a second drive mode.

In step S130, the control section 90 sets a rotational speed ratio, i.e., range, of the transmission 58 so that the rotational speed of SMG 30 may not enter the zero-zone. Concretely, the control section 90 sets the transmission range by shifting from a higher range to a lower range as shown in FIG. 12. Then, the control section 90 advances it to step S140.

In step S140, the control section 90 transmits a transmission control command to the transmission 58 so that the range is shifted to a range set at step S130, i.e., to a lower range. By performing process described above, since the range of the transmission 58 is changed, transitional action of SMG 30 from backward rotation to forward rotation is reduced.

FIG. 12 shows a timing diagram. FIG. 12 corresponds to the timing diagram in FIG. 4 in the first embodiment. There are some differences such as added lines about the transmission 58, and rotational speed of FMG 20 and SMG 30 and torque of FMG 20 in the third period T3. As mentioned in the first embodiment, rotation of SMG 30 transits from backward rotation to forward rotation as backward rotation is weakened. Then, negative torque is generated on FMG 20 and forward rotation of FMG 20 is weakened. On the other hand, in this embodiment, the transmission range is changed from a higher range to a lower range at the second time t2 which is the beginning the third period T3. By this arrangement, rotational speed of SMG 30 in backward rotation is increased, and rotational speed of FMG 20 in forward rotation is increased. Thereby, generation of negative torque on FMG 20 may be reduced, and also, dropping of vehicle speed may be reduced. In this embodiment, the engine 10 can be started at the third time t3 which is the beginning of the fourth period T4. After starting the engine 10, the transmission range of the transmission 58 is changed from a lower range to a middle range, which provides a middle transmission ratio between the lower range and the higher range.

Behavior of rotational speed and torque caused by the above mentioned changing control of the transmission range of the transmission 58 is also shown on the collinear diagrams in FIGS. 13-16. Although some descriptions will be repeated, the behavior of rotational speed and the transmission range are explained referring to FIGS. 13-16. FIGS. 13-16 correspond to FIGS. 5-8 respectively. SG, PC, and RG are abbreviations for the sun gear 41, the planetary carrier 42, and the ring gear 43.

Figure 13:
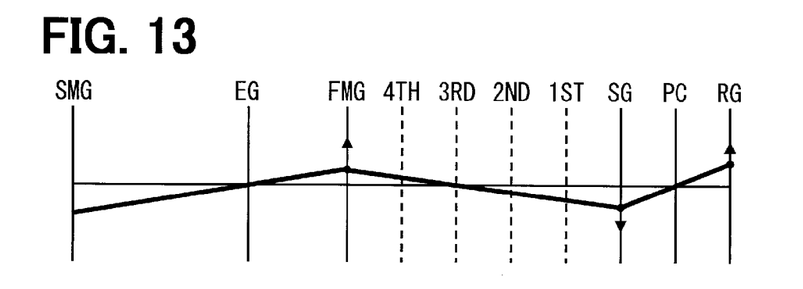
FIG. 13 is a collinear diagram of rotational speeds at a first period T1.
Figure 14:
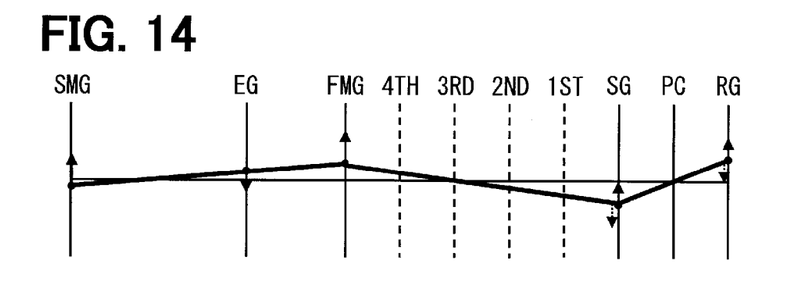
FIG. 14 is a collinear diagram of rotational speeds at a second period T2.
Figure 15:
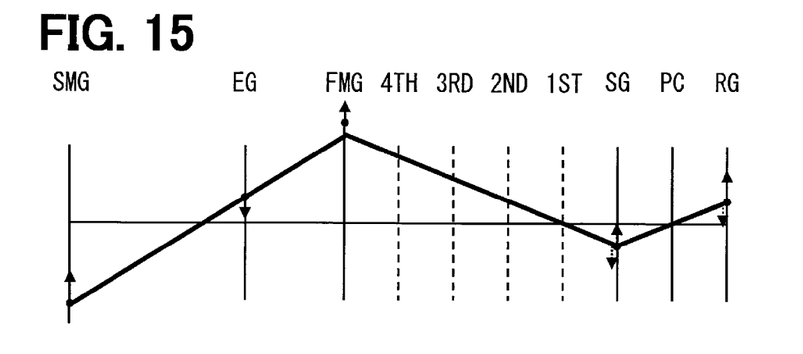
FIG. 15 is a collinear diagram of rotational speeds at a third period T3.
Figure 16:
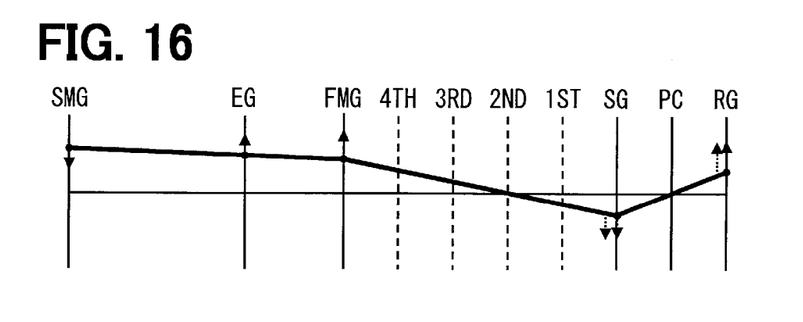
FIG. 16 is a collinear diagram of rotational speeds at a fourth period T4.

As shown in FIG. 13, in the first period T1, the transmission range is operated in the third range, e.g., the higher range. Even if the battery section 70 fails, the transmission range is maintained at the third range in the second period as shown in FIG. 14. However, if it is reached to a transitional phase where SMG 30 transits from backward rotation to forward rotation, the transmission range is changed from the third range to the first range, e.g., the lower range, at the third period T3 as shown in FIG. 15. By this, rotational speed of FMG 20 in forward rotation and rotational speed of SMG 30 in backward rotation are increased. Therefore, it is reduced to transit SMG 30 to forward rotation. It is also reduced to, generate negative torque on FMG 20. Then, the engine 10 begins to start, i.e., begins to generate forward torque by combustion, the transmission range is changed from the first range to the second range, e.g., the middle range, at the fourth period T4 as shown in FIG. 16.

As described above, the hybrid vehicle 100 according to this embodiment has the transmission 58. The transmission 58 increases rotational speed of FMG 20 by adjusting the rotational ratio between FMG 20 and the driving wheel 52 so as to hinder a transition from backward rotation to forward rotation at just before the transition from backward rotation to forward rotation of SMG 30, when the battery section 70 fails. According to this arrangement, it is possible to reduce amount of dropping of the vehicle speed caused by negative torque on FMG 20 due to a transition from backward rotation to forward rotation of SMG 30.

Since it is reduced that SMG 30 rotates at a low speed in forward rotation during the engine 10 is not active, i.e., during the periods T2-T3, it is possible to reduce heat generation on SMG 30.

Other Embodiments

While the present disclosure has been described with reference to embodiments thereof, it is to be understood that the disclosure is not limited to the embodiments and constructions. The present disclosure is intended to cover various modification and equivalent arrangements. In addition, while the various combinations and configurations are preferred, other combinations and configurations, including more, less or only a single element, are also within the spirit and scope of the present disclosure.

Figure 17:
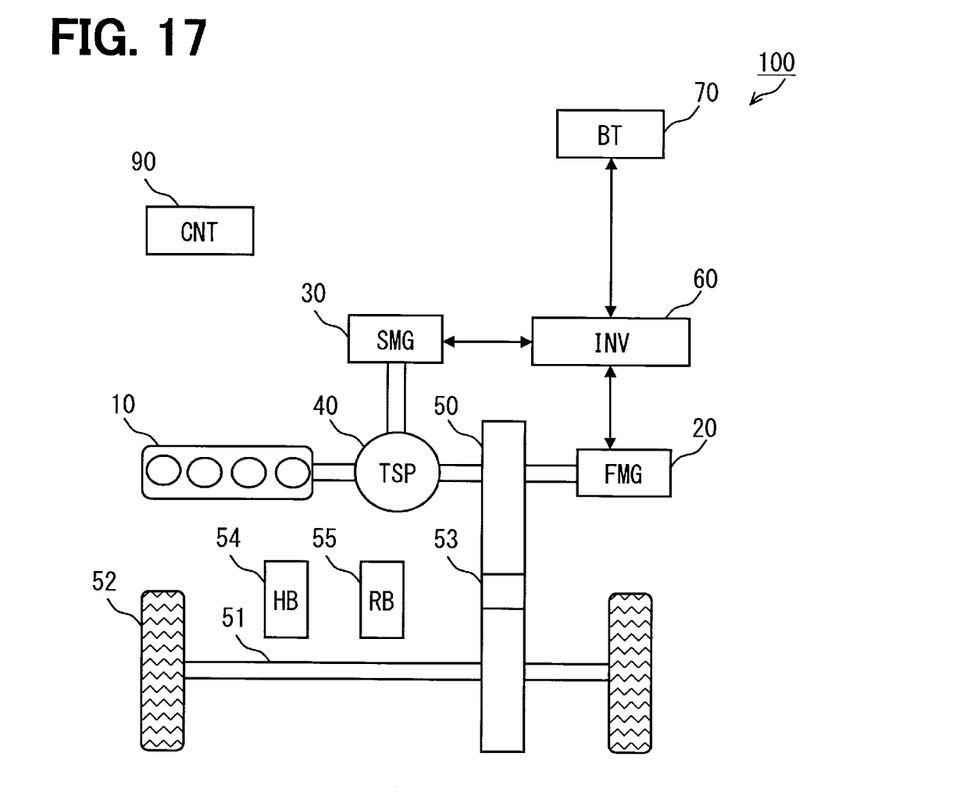
FIG. 17 is a block diagram showing an alternative arrangement of a hybrid vehicle.

In the above mentioned embodiments, the hybrid vehicle 100 has the capacitive section 80. Alternatively, the hybrid vehicle 100 may have no capacitive section 80 as shown in FIG. 17. In this case, if a failure occurs in the battery section 70, electric power generated in SMG 30 is directly supplied to the inverter 60.

In the embodiments, the inverter 60 and the battery section 70 are electrically connected through the first switch device 56, and the inverter 60 and the capacitive section 80 are electrically connected through the second switch device 57. Alternatively, the hybrid vehicle 100 may have no switch devices like 56 and 57 as shown in FIG. 17.

In the embodiments, the control section 90 performs control not only for the inverter 60, but also for the switches 56 and 57, a ratio adjusting of the braking force of brake devices 54 and 55, and connecting state of the clutch 53. Alternatively, another controller may perform controls for the switches 56 and 57, ratio adjusting of the braking force of brake devices 54 and 55, and connecting state of the clutch 53.

In the embodiments, the control section generates signal to notices the user about an abnormality occurring on the battery section 70 and a transition from the first drive mode to the second drive mode. Alternatively, the control section 90 may be configured to perform neither noticing function nor warning function.

In the embodiments, the control section 90 shuts down electric connection between the inverter 60 and the battery section 70 in the second control. Alternatively, the control section 90 may not shut down the electric connection between the inverter 60 and the battery section 70.

In the embodiments, the control section 90 disconnects the clutch 53 in the second control. Alternatively, the control section 90 may not disconnect the clutch 53 in the second control. Furthermore, the hybrid vehicle 100 may have no clutch 53.

In the embodiments, the control section 90 varies the ratio of braking power between the hydraulic brake 54 and the regenerative brake 55 in the second control. Alternatively, the control section 90 may not vary the ratio of braking power in the second control.

In the second embodiment, the transmission 58 adjusts the rotational ratio to four ranges. Alternatively, number of adjusting steps of the rotational ratio is not limited to the embodiment.

What is claimed is:

1. A hybrid vehicle comprising:
an internal combustion engine which transmits drive power to a drive shaft; a first motor-generator which transmits drive power to a drive shaft;
a second motor-generator which generates electric power by drive power of the internal combustion engine;
a battery section which stores electric power to be supplied to the first motor-generator, and electric power for carrying out cranking of the internal combustion engine;
a control section which is capable of controlling torque of each of the first motor-generator, the second motor-generator, and the combustion engine; and
a drive power splitter mechanism having a sun gear engaged with the second motor-generator, a planetary carrier engaged with the internal combustion engine, a ring gear engaged with the first motor-generator, and a pinion gear carried on the planetary carrier, and which is rotated by meshing the ring gear and the sun gear via the pinion gear, so that a relationship of rotational speeds of the first motor-generator, a second motor-generator and the internal combustion engine are expressed by a straight line on the collinear diagram, wherein rotation and torque propelling the hybrid vehicle forward are assumed as forward rotation and positive torque and opposite rotation and opposite torque are assumed as backward rotation and negative torque, and wherein
the control section includes
a first control section which transmits only the drive power of the first motor-generator to the drive shaft while not starting the internal combustion engine by rotating the sun gear in the backward rotation while generating the positive torque on the ring gear and rotating the ring gear in the forward rotation, and
a second control section which starts the internal combustion engine by carrying out cranking, in a case that the battery section fails while performing the first control, by generating the positive torque on the sun gear rotating in the backward rotation to generate electric power and rotating the first motor-generator by generated electric power, and generating the positive torque on the pinion gear by difference of rotational speeds between the sun gear and the ring gear.

2. The hybrid vehicle in claim 1, wherein
the control section, in the second control, calculates output of the second motor-generator, and adjusts output of the first motor-generator to a value of the calculated output of the second motor-generator with an inverted positive-negative sign.

3. The hybrid vehicle in claim 1, wherein
the control section, in the second control, shut downs an electric connection between the battery section and the second motor-generator and an electric connection between the battery section and the first motor-generator respectively.

4. The hybrid vehicle in claim 3, further comprising:
a capacitive section which stores electric power generated by the second motor-generator when the battery section fails.

5. The hybrid vehicle in claim 1, further comprising:
a transmission which adjusts a rotational speed ratio between the first motor-generator and a driving wheel, wherein
the transmission increases a rotational speed of the first motor-generator by controlling the rotational speed ratio between the first motor-generator and the driving wheel so as to hinder transition from the backward rotation to the forward rotation before the second motor-generator transits from the backward rotation to the forward rotation, when the battery section fails.

6. The hybrid vehicle in claim 1, further comprising:
a hydraulic brake; and
a regenerative brake, wherein
the control section adjusts a ratio of braking power between the hydraulic brake and the regenerative brake, and increases a share of the regenerative brake when the second motor-generator rotates in the forward rotation in the second control more than a share of the regenerative brake in the first control.

7. The hybrid vehicle in claim 1, further comprising:
a hydraulic brake; and
a regenerative brake, wherein
the control section adjusts a ratio of braking power between the hydraulic brake and the regenerative brake, and increases a share of the hydraulic brake when the second motor-generator rotates in the backward rotation in the second control more than a share of the hydraulic brake in the first control.

8. The hybrid vehicle in claim 1, further comprising:
a clutch which adjusts transmitting condition of drive power to the drive shaft from both the internal combustion engine and the first motor-generator, wherein
the control section shut down transmitting of drive power to the drive shaft by cutting the clutch in the second control.

* * * * *